(12) United States Patent
Miyauchi et al.

(10) Patent No.: US 8,571,712 B2
(45) Date of Patent: Oct. 29, 2013

(54) ROBOT SYSTEM

(75) Inventors: Kohei Miyauchi, Fukuoka (JP); Yuusuke Hirano, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 291 days.

(21) Appl. No.: 12/870,850

(22) Filed: Aug. 30, 2010

(65) Prior Publication Data

US 2011/0054682 A1    Mar. 3, 2011

(30) Foreign Application Priority Data

Aug. 31, 2009  (JP) .................................. 2009-200796

(51) Int. Cl.
*G05B 19/04* (2006.01)
(52) U.S. Cl.
USPC ......................................... 700/248; 414/731
(58) Field of Classification Search
USPC ................ 700/245, 247, 248, 260, 261, 250; 318/561; 414/730, 731, 733, 744.1, 414/744.2, 744.3
See application file for complete search history.

(56) References Cited

U.S. PATENT DOCUMENTS

| | | | |
|---|---|---|---|
| 4,026,526 A | 5/1977 | Messerschmidt et al. | |
| 4,541,770 A | 9/1985 | Niinomi et al. | |
| 4,664,873 A | 5/1987 | Hendrich et al. | |
| 6,466,843 B1 * | 10/2002 | Bonanni et al. | 700/245 |
| 6,668,668 B1 * | 12/2003 | Peshkin | 73/862.56 |
| 7,043,337 B2 * | 5/2006 | Colgate et al. | 700/213 |
| 7,461,753 B1 * | 12/2008 | Gatta et al. | 212/331 |
| 2003/0075415 A1 | 4/2003 | Ito | |
| 2005/0033475 A1 * | 2/2005 | Kuroki et al. | 700/245 |
| 2006/0072988 A1 | 4/2006 | Hariki et al. | |
| 2006/0178775 A1 * | 8/2006 | Zhang et al. | 700/245 |
| 2008/0145199 A1 * | 6/2008 | Powers | 414/416.11 |
| 2008/0234861 A1 * | 9/2008 | Fortell et al. | 700/245 |
| 2010/0229669 A1 * | 9/2010 | Kim et al. | 74/490.01 |

FOREIGN PATENT DOCUMENTS

| | | |
|---|---|---|
| CN | 1412103 | 4/2003 |
| DE | 102006056528 | 6/2008 |
| FR | 2629849 | 10/1989 |
| JP | 51-72049 | 6/1976 |

(Continued)

OTHER PUBLICATIONS

Harada, K.; Kajita, S.; Saito, H.; Morisawa, M.; Kanehiro, F.; Fujiwara, K.; Kaneko, K.; Hirukawa, H.; , "A Humanoid Robot Carrying a Heavy Object," Robotics and Automation, 2005. ICRA 2005. Proceedings of the 2005 IEEE International Conference on , vol., No., pp. 1712-1717, Apr. 18-22, 2005.*

(Continued)

*Primary Examiner* — Khoi Tran
*Assistant Examiner* — Adam Mott
(74) *Attorney, Agent, or Firm* — Ditthavong Mori & Steiner, P.C.

(57) ABSTRACT

A robot system includes a crane unit, a crane moving mechanism, a manipulator unit, and a controller. The crane unit is configured to suspend a workpiece. The crane moving mechanism allows the crane unit to move in a horizontal direction. The manipulator unit holds and moves the crane unit supporting the workpiece. The controller is configured to control the crane unit to support the workpiece at a first position and control the manipulator unit to move the crane unit supporting the workpiece toward a second position and to place the supported workpiece at the second position.

19 Claims, 4 Drawing Sheets

(56) References Cited

FOREIGN PATENT DOCUMENTS

| JP | 58-77466 | 5/1983 |
| JP | 60-191778 | 9/1985 |
| JP | 04-93189 | 3/1992 |
| JP | 2006-035397 | 2/2006 |

OTHER PUBLICATIONS

Kajita, S.; Kanehiro, F.; Kaneko, K.; Fujiwara, K.; Harada, K.; Yokoi, K.; Hirukawa, H.; , "Resolved momentum control: humanoid motion planning based on the linear and angular momentum," Intelligent Robots and Systems, 2003. (IROS 2003). Proceedings. 2003 IEEE/RSJ International Conference on , vol. 2, No., pp. 1644-1650 vol. 2, Oct. 27-31, 2003.*

Chinese Office Action for corresponding CN Application No. 201010262982.3, Jan. 12, 2012.

Japanese Office Action for corresponding JP Application No. 2009-200796, Mar. 19, 2013.

Extended European Search Report for corresponding EP Application No. 10171330.3-1712, Jun. 18, 2013.

* cited by examiner

ROBOT SYSTEM

CROSS-REFERENCE TO RELATED APPLICATION

The present application claims priority under 35 U.S.C. §119 to Japanese Patent Application No. 2009-200796, filed Aug. 31, 2009. The contents of this application are incorporated herein by reference in its entirety.

BACKGROUND OF THE INVENTION

1. Field of the Invention

The present invention relates to a robot system.

2. Description of the Related Art

It is desirable to eliminate or save manpower in a manufacturing process or a transfer process by allowing a robot to carry out various works which have relied upon the manpower.

For example, in a manufacturing site for a machine product such as an industrial robot, in many cases, an integrated transfer line may not be provided due to the layout of a factory, and a transfer work is required for transferring a workpiece from a previous process to a next process.

In order to automate the work, for example, Japanese Patent Laid-Open Publication No. 2006-035397 suggests a robot that picks and transfers a workpiece or the like.

SUMMARY OF THE INVENTION

According to one aspect of the present invention, a robot system includes a crane unit, a crane moving mechanism, a manipulator unit, and a controller. The crane unit is configured to suspend a workpiece. The crane moving mechanism allows the crane unit to move in a horizontal direction. The manipulator unit holds and moves the crane unit supporting the workpiece. The controller is configured to control the crane unit to support the workpiece at a first position and control the manipulator unit to move the crane unit supporting the workpiece toward a second position and to place the supported workpiece at the second position.

According to another aspect of the present invention, a robot system includes a manipulator unit, a controller, and a crane signal input section. The manipulator unit includes a hand unit. The controller is configured to control a motion of the manipulator unit. The controller includes a crane signal input section configured to receive an input of a position signal from a crane unit that suspends a workpiece and that drives the workpiece in a vertical direction, the controller being configured to control the motion of the manipulator unit based on the position signal from the crane unit.

BRIEF DESCRIPTION OF THE DRAWINGS

The present invention will be described in further detail with reference to the accompanying drawings wherein.

DETAILED DESCRIPTION OF THE EMBODIMENTS

First Embodiment

A transfer system (Robot system) 100 according to this embodiment is part of a manufacturing line for machine products (workpieces W). The transfer system 100 transfers the workpieces W that have been processed in a previous process (first equipment, not shown) to a next process (second equipment, not shown). A workpiece W is illustrated as a box-like object, however, for example, the workpiece W may be actually a base member or an arm member for an industrial robot. The workpiece W may be any one of various types of machine products.

(General Configuration)

Figure 1:
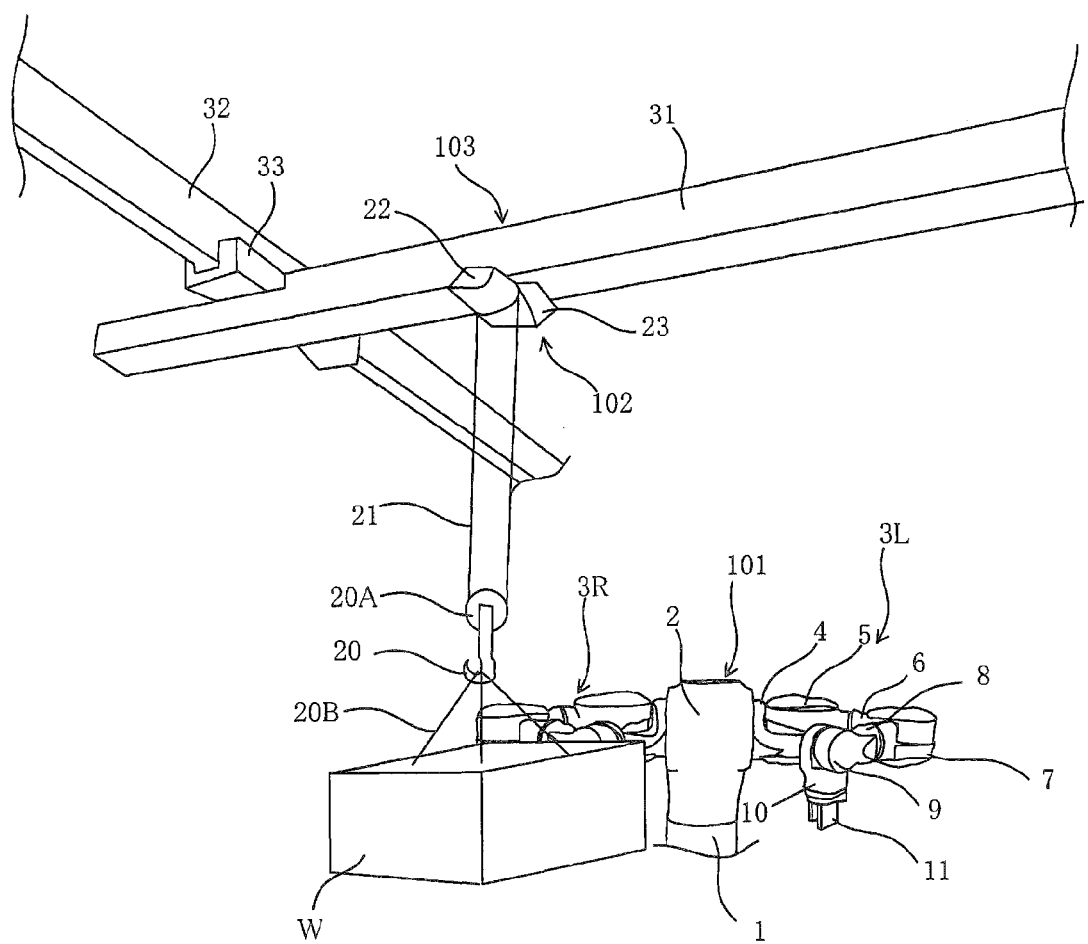
FIG. 1 is a perspective view showing a system configuration according to a first embodiment.
Figure 2:
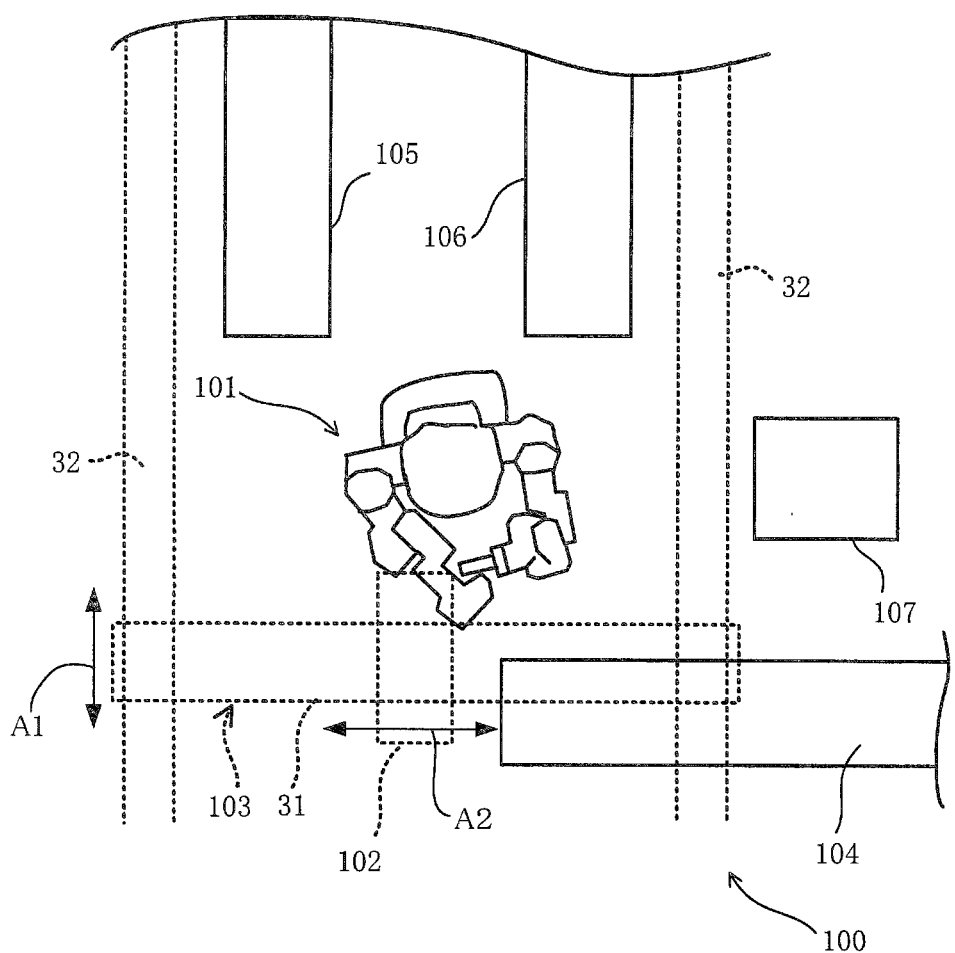
FIG. 2 is a general arrangement plan schematically showing the system configuration.

Referring to FIGS. 1 and 2, the transfer system 100 includes a robot (a manipulator unit) 101, a hoist (a crane unit, supporting unit) 102, a crane rail (a crane moving mechanism, moving unit) 103, a carry-in belt (a first position) 104, a first carry-out belt (a second position) 105, a second carry-out belt (a second position) 106, and a controller 107.

The supporting unit 102 suspends and supports the workpiece W. The moving unit 103 allows the supporting unit 102 to move in a horizontal direction. In this embodiment, the hoist 102 serves as the supporting unit, and the crane rail 103 serves as the moving unit.

The controller 107 is a computer including a storage device, an electronic computer device, an input device, and a display device. The controller 107 is connected with actuators of the robot 101, the hoist 102, and the crane rail 103 through lines, so that the controller 107 communicates with the actuators.

The carry-in belt 104 includes a transfer conveyor. The workpieces W which have been processed in the previous process (not shown) are successively carried to the transfer system 100.

The first carry-out belt 105 and the second carry-out belt 106 each include a transfer conveyor to transfer the workpieces W to the next process.

Any one of or all the carry-in belt 104, the first carry-out belt 105, and the second carry-out belt 106 may not have a transfer conveyor, and the workpieces W may be transferred from the previous process by using a transfer vehicle such as an automatic guided vehicle (AGV). In this case, the transfer vehicle may serve as the first position or the second position according to the first embodiment of the present invention.

(Crane Unit)

The hoist 102 and the crane rail 103 use an existing crane device in a production factory or the like. The crane rail 103 includes a pair of rail members 32 supported at a ceiling and extending in the horizontal direction in parallel to one another, and a rail member 31 bridged between the rail members 32.

It is to be noted that "the horizontal direction" includes all directions orthogonal to the gravity direction. "The horizontal direction" is not a strictly mathematically defined horizontal direction, but may a horizontal direction including a direction component orthogonal to the gravity direction.

The rail member 31 is supported by the rail members 32 through a pair of carriers 33. When the carriers 33 are driven, the rail member 31 moves in an extending direction of the rail members 32 (indicated by arrow A1). The carriers 33 respectively have electric actuators (not shown). The controller 107 controls the motion of the carriers 33.

The hoist 102 includes a hook 20, a wire 21, a winding device 22, and a carrier 23.

The carrier 23 is supported by the rail member 31. When the carrier 23 is driven, the hoist 102 moves in an extending direction of the rail member 31 (indicated by arrow A2). The carrier 23 has an electric actuator (not shown). The controller 107 controls the motion of the carrier 23.

The wire 21 is wound and suspended by the winding device 22. The hook 20 is suspended from a lowermost portion of the wire 21 through a pulley 20A.

A coupling member (in this case, a wire) 20B is coupled with the workpiece W in advance, and the hook 20 catches the coupling member 20B. Thus, the hook 20 suspends the workpiece W and hence can support the workpiece W against the gravity.

The winding device 22 includes a servomotor. When the servomotor is driven, the winding device 22 winds or rewinds the wire 21 to drive the hook 20 in a vertical direction.

The servomotor of the winding device 22 and the controller 107 are connected with one another and communicate with one another. Rotation position information (a position signal) of the servomotor is input to an input terminal (a crane signal input section) of the controller 107. The controller 107 transmits a driving signal to the servomotor.

(Manipulator Unit)

The robot 101 includes a pedestal 1 that is fixed to a floor by anchor bolts (not shown), and a rotary body 2 mounted on the pedestal 1 and being rotatable within a vertical plane.

The rotary body 2 has a pair of arms including a right arm (an arm) 3R and a left arm (an arm) 3L.

The right arm 3R and the left arm 3L have a configuration similar to one another except that the arms 3R and 3L are left-right symmetric. Each of the arms 3R and 3L is a seven-degree-of-freedom vertical articulated manipulator. Each of the arms 3R and 3L has movable portions. Each of the portions contains a servomotor. Driving of the servomotor is controlled in response to a signal from the controller 107.

In particular, each of the right arm 3R and the left arm 3L includes a shoulder 4 that is rotatable along a horizontal plane (a plane parallel to the floor). An upper arm A-section 5 is swingably provided at the shoulder 4. An upper arm B-section 6 is provided at a distal end of the upper arm A-section 5. The upper arm B-section 6 provides a twisting motion around the upper arm A-section 5.

In addition, a lower arm 7 is swingably provided at a distal end of the upper arm B-section 6. A wrist A-section 8 is provided at a distal end of the lower arm 7. A wrist B-section 9 is provided at a distal end of the wrist A-section 8.

The wrist A-section 8 provides a twisting motion around the lower arm 7. The wrist B-section 9 provides a rotating motion for a bending motion.

A flange 10 is provided at a distal end of the wrist B-section 9. A hand unit 11 is attached to the flange 10. When a servomotor for moving the flange 10 is driven, the hand unit 11 is rotated, and is stopped (positioned) at a position instructed by the controller 107.

The hand unit 11 includes a pair of finger members that are advanced to and retracted from one another to grip an object. The advancing and retracting motion of the finger members is performed by a servomotor and controlled by the controller 107.

The storage device in the controller 107 stores a work procedure in advance, and operates the robot 101, the hoist 102, and the crane rail 103 in accordance with the stored work procedure.

The controller 107 also stores a threshold T of a disturbance load (a torque) exerted on the servomotors in the robot 101. If an external load higher than the threshold T is exerted on the servomotors, the controller 107 allows the servomotor to rotate in a direction in which the load is exerted (torque controller).

The transfer system according to this embodiment has the configuration as described above, and operates as follows.

Figure 3:
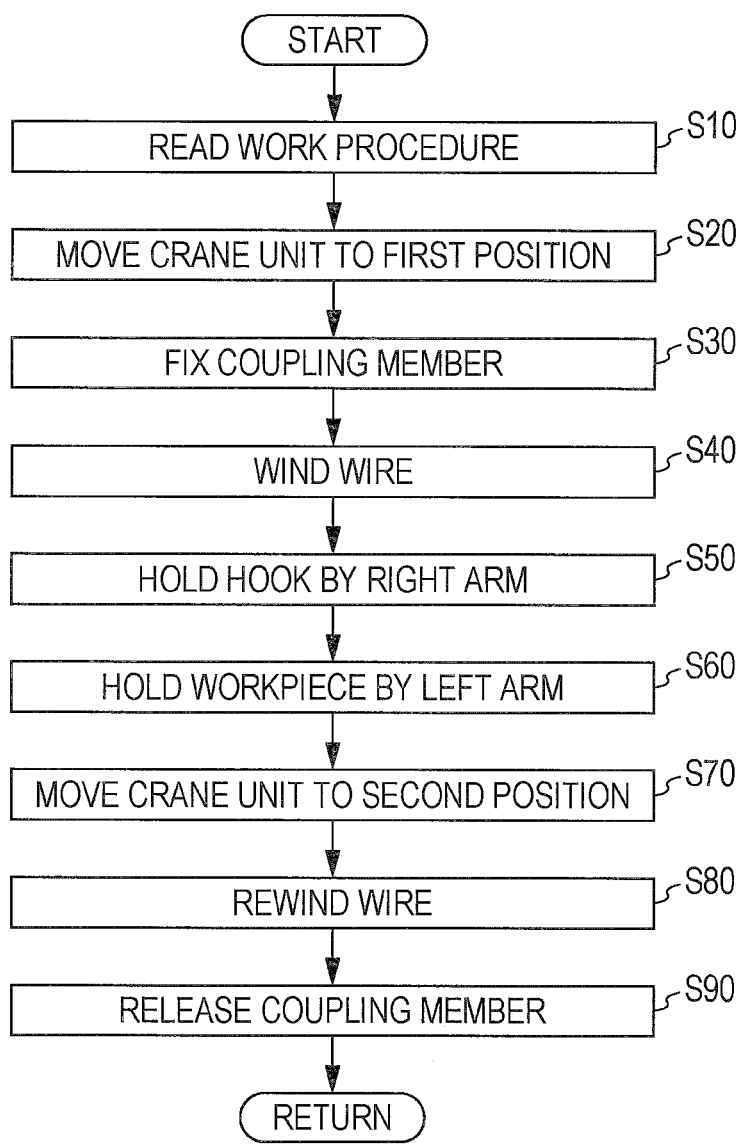
FIG. 3 is a flowchart showing processing for executing an algorism.
Figure 4:
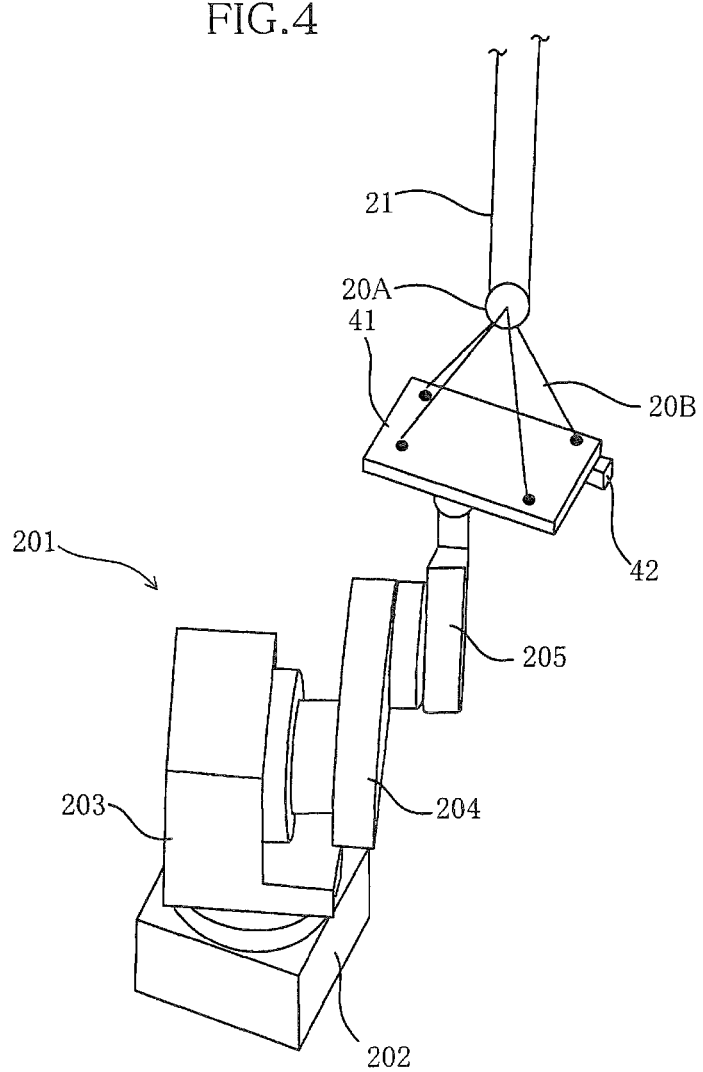
FIG. 4 is a perspective view showing a system configuration according to a second embodiment.

Referring to FIG. 3, in step S10, if start of work is input from an input device of the controller 107, the controller 107 reads a stored work procedure.

In step S20, the carriers 23 and 33 are operated, and the hook 20 is moved to a position above an end portion of the carry-in belt 104. Also, the right arm 3R and the left arm 3L of the robot 101 are moved toward the carry-in belt 104.

In step S30, the arms 3R and 3L are operated, so that each hand unit 11 grips the coupling member 20B which has been fixed to the workpiece W and the hook 20 catches the workpiece W.

Steps S10 to S30 define means for causing the hoist 102 to support the workpiece W at a first position.

When the coupling member 20B is caught, in step S40, the winding device 22 is operated, and the hook 20 is moved upward. Accordingly, the workpiece W is suspended by the wire 21.

In step S50, the hand unit 11 of the right arm 3R grips (holds) the hook 20. In step S60, the hand unit 11 of the left arm 3L grips (holds) a predetermined position of the workpiece W (a portion of the workpiece W deviated from the center of gravity).

If step S60 is executed, in step S70, the carriers 23 and 33 and the robot 101 are operated, and the workpiece W is moved to a position above one of the first carry-out belt 105 and the second carry-out belt 106.

In this embodiment, the workpieces W are moved alternately to the first carry-out belt 105 and the second carry-out belt 106 in that order. However, the transfer destination of the workpieces W may be determined whether the first carry-out belt 105 or the second carry-out belt 106 depending on a processing state of the next process or the type of the workpieces W.

In step S80, the winding device 22 is operated to rewind the wire 21 (extends the wire 21), and the supported workpiece W is moved downward. Thus, the workpiece W is placed on the first carry-out belt 105 or the second carry-out belt 106.

When the workpiece W is placed, in step S90, the arms 3R and 3L release the coupling member 20B from the hook 20. The processing is repeated from step S10.

Steps S50 to S80 define means for causing the robot 101 to move the hoist 102 and to place the supported workpiece W at the second position.

With the transfer system according to this embodiment, when a workpiece W with a large weight is transferred from the carry-in belt 104 to the first carry-out belt 105 or the second carry-out belt 106, the robot 101 allows the workpiece W to be caught by the hook 20 of the hoist 102 and to be suspended and supported. Thus, a workpiece W with a large weight can be reliably supported although a robot 101 with a small weight capacity is used.

The controller 107 controls the motions of the robot 101, the winding device 22, and the carriers 23 and 33. Thus, the workpiece W that is supported along the rail member 31 and the rail members 32 can be moved in the horizontal direction.

The system can be constructed in corporation with the robot 101 merely by connecting the controller 107 with the servomotors and the electric actuators of the hoist 102 and the crane rail 103, which already exist in a factory or the like.

When the equipment is introduced, large equipment such as a crane need not be newly installed. The installation space can be saved. In addition, the cost for introducing the system can be saved.

The right arm 3R holds the hook 20, and then the left arm 3L holds the workpiece W while the right arm 3R holds the hook 20. Thus, the workpiece W can be reliably held although the workpiece W is in a free (unstable) state in which the workpiece W is suspended by the wire 21.

The right arm 3R holds the hook 20 at the position corresponding to the center of gravity of the workpiece W, and the left arm 3L holds the workpiece W at the position deviated from the center of gravity. Thus, the workpiece W can be transferred in a desirable posture while rotation of the wire 21 in a twisting direction is restricted.

Second Embodiment

A second embodiment will be described. Components not particularly described in this embodiment are similar to those according to the first embodiment. The same reference signs are applied to those components in the following description.

In this embodiment, a robot (a manipulator) 201 is a single-arm manipulator.

The robot 201 includes a pedestal 202, a first member 203 rotatably coupled with the pedestal 202, a second member 204 rotatably coupled with the first member 203, and a third member 205 rotatably coupled with the second member 204.

The respective rotary portions include servomotors. A controller 107 controls the motions of the servomotors. Similar to the first embodiment, the controller 107 also stores a threshold T of a disturbance load (a torque) exerted on the servomotors. If an external load higher than the threshold T is exerted on the servomotors, the controller 107 allows the servomotors to rotate in a direction in which the load is exerted (torque controller).

A hand unit 41 is coupled with a distal end of the third member 205. An air cylinder 42 is attached to the hand unit 41. The air cylinder 42 includes a rod member (not shown) that can protrude and be retracted.

The hand unit 41 is coupled with a pulley 20A through a coupling member 20B. The hand unit 41 is continuously suspended and supported by the hoist 102.

In this embodiment, carriers 23 and 33 of the hoist 102 and a crane rail 103 do not include an actuator. The carriers 23 and 33 include driven wheels (not shown) that allow the carriers 23 and 33 to travel along the rail members 31 and 32.

The transfer system according to this embodiment is thus configured. The controller 107 operates the robot 201 to move the hand unit 41 to a position above a carry-in belt 104. At this time, the carrier 23 of the hoist 102, and the carriers 33 of the crane rail 103 are moved to follow the motion of the robot 201.

Then, when the winding device 22 is driven, the wire 21 is rewound, and the hand unit 41 is lowered to a position near the workpiece W. A rod member of an air cylinder 42 is inserted into a predetermined fitting hole of a workpiece W. The hand unit 41 holds the workpiece W.

When the workpiece W is held, the winding device 22 suspends and moves the hand unit 41 upward, and the workpiece W is suspended by the wire 21 through the hand unit 41.

Then, the robot 201 is operated, and the hand unit 41 is moved to a position above a first carry-out belt 105 or a second carry-out belt 106. At this time, the carrier 23 of the hoist 102, and the carriers 33 of the crane rail 103 are moved to follow the motion of the robot 201.

The winding device 22 is operated and the wire 21 is rewound. The supported workpiece W is moved downward and is placed on the first carry-out belt 105 or the second carry-out belt 106.

When the workpiece W is placed, the air cylinder 42 is operated, the rod member is detached from the workpiece W, and the holding of the workpiece W with the hand unit 41 is released.

As described above, with the transfer system according to this embodiment, a workpiece W with a relatively large weight can be automatically transferred by using a manipulator with a simple structure as the robot 201. In addition, since the hoist 102 continuously suspends the hand unit 41, the hoist 102 can support the workpiece W merely by holding the workpiece W with the rod member or the like of the hand unit 41. The motion for holding and releasing the workpiece W can be smoothly performed. Thus, working efficiency can be increased.

When the rod member is inserted into the fitting hole in the workpiece W, the hand unit 41 has to be positioned with high accuracy. However, the servomotors of the robot 201 may be rotated in a direction in which a load (an external force) is exerted. Thus, even if an error occurs in the positions or directions between the fitting hole and the rod member, the error is absorbed. The hand unit 41 can accurately hold the workpiece W.

The embodiments have been described. However, the transfer system according to the embodiments of the present invention is not limited to the embodiments, and may be appropriately modified within the scope of the present invention.

For example, in the above embodiments, each of the crane unit and the crane moving mechanism includes the rail members supported at the ceiling. The crane unit and the crane moving mechanism are not limited to the configurations described in the embodiments, and any configuration may be applied as long as the workpiece W is suspended and supported, and the supported workpiece W can be moved in the horizontal direction.

Also, similar to the first embodiment, a common hand unit may be attached to a manipulator having a pair of arms, and the hand unit may be continuously suspended and supported by a crane unit.

Obviously, numerous modifications and variations of the present invention are possible in light of the above teachings. It is therefore to be understood that within the scope of the appended claims, the invention may be practiced otherwise than as specifically described herein.

What is claimed is:

1. A robot system comprising:
    a crane unit configured to suspend a workpiece;
    a crane moving mechanism that allows the crane unit to move in a horizontal direction;
    a manipulator unit that holds and moves the crane unit supporting the workpiece; and
    a controller configured to control the crane unit to support the workpiece at a first position and configured to control the manipulator unit to move the crane unit supporting the workpiece toward a second position and to place the supported workpiece at the second position,
    wherein the manipulator unit comprises:
        an arm; and
        a plurality of servomotors that drive the arm, and
    wherein the controller comprises a torque controller that, if a load equal to or higher than a predetermined load is exerted on the servomotors, allows rotation of the servomotors to follow the load.

2. The robot system according to claim 1, further comprising a hand unit coupled to a distal end of the manipulator unit, the hand unit being capable of holding and releasing the workpiece, the hand unit being suspended by the crane unit.

3. The robot system according to claim 1, wherein the manipulator unit comprises a pair of arms each having a hand unit at a distal end of each of the arms.

4. The robot system according to claim 3, wherein when the manipulator unit moves the crane unit toward the second position, one arm among the pair of arms holds the crane unit and another arm among the pair of arms holds the workpiece supported by the crane unit.

5. The robot system according to claim 1,
wherein the crane moving mechanism comprises a rail member, the rail member extending in the horizontal direction, and
wherein the crane unit is supported movably along the rail member.

6. The robot system according to claim 1, wherein the manipulator unit includes a pedestal that is fixed to a floor, and a rotary body mounted on the pedestal and being rotatable with respect to the pedestal.

7. The robot system according to claim 1, wherein the controller includes a storage device configured to store a work procedure, and wherein the controller is configured to operate the manipulator unit, the crane unit, and the crane moving mechanism in accordance with the stored work procedure.

8. The robot system according to claim 1, wherein the controller is further configured to control the manipulator unit to move the crane unit supporting the workpiece toward a third position and to place the supported workpiece at the third position.

9. The robot system according to claim 8, wherein controller is further configured to control the manipulator unit to move the crane unit supporting the workpiece from the first position toward the second position and the third position alternately.

10. A robot system comprising:
a manipulator unit comprising:
  a hand unit; and
a controller configured to control a motion of the manipulator unit and comprising:
  a crane signal input section configured to receive an input of a position signal from a crane unit that suspends a workpiece and that drives the workpiece in a vertical direction, the controller being configured to control the motion of the manipulator unit based on the position signal from the crane unit,
wherein the manipulator unit comprises:
  an arm to which the hand unit is connected; and
  a plurality of servomotors that drive the arm, and
wherein the controller comprises a torque controller that, if a load equal to or higher than a predetermined load is exerted on the servomotors, allows rotation of the servomotors to follow the load.

11. The robot system according to claim 10, wherein the manipulator unit includes a pedestal that is fixed to a floor, and a rotary body mounted on the pedestal and being rotatable with respect to the pedestal.

12. The robot system according to claim 10, wherein the controller includes a storage device configured to store a work procedure, and wherein the controller is configured to operate the manipulator unit in conjunction with the operation of the crane unit and in accordance with the stored work procedure.

13. The robot system according to claim 10, wherein the controller is further configured to control the manipulator unit to move the crane unit supporting the workpiece from a first position toward a second position or a third position, and to place the supported workpiece at the second position or the third position.

14. The robot system according to claim 13, wherein controller is further configured to control the manipulator unit to move the crane unit supporting the workpiece from the first position toward the second position and the third position alternately.

15. A robot system comprising:
supporting means for suspending and supporting a workpiece;
moving means for allowing the supporting means to move in a horizontal direction;
manipulating means for holding and moving the supporting means supporting the workpiece; and
controlling means for controlling the supporting means to support the workpiece at a first position and controlling the manipulating means to move the supporting means supporting the workpiece toward a second position and to place the workpiece at the second position,
wherein the manipulating means comprises:
  an arm; and
  a plurality of servomotors that drive the arm, and
wherein the controlling means comprises a torque controller that, if a load equal to or higher than a predetermined load is exerted on the servomotors, allows rotation of the servomotors to follow the load.

16. The robot system according to claim 15, wherein the manipulating means includes a pedestal that is fixed to a floor, and a rotary body mounted on the pedestal and being rotatable with respect to the pedestal.

17. The robot system according to claim 15, wherein the controlling means includes a storage device configured to store a work procedure, and wherein the controlling means operates the manipulating means, the supporting means, and the moving means in accordance with the stored work procedure.

18. The robot system according to claim 15, wherein the controlling means is further configured to control the manipulating means to move the supporting means supporting the workpiece from a first position toward a second position or a third position, and to place the supported workpiece at the second position or the third position.

19. The robot system according to claim 18, wherein controlling means is further configured to control the manipulating means to move the supporting means supporting the workpiece from the first position toward the second position and the third position alternately.

* * * * *